United States Patent [19]
Schocher et al.

[11] 3,891,504
[45] June 24, 1975

[54] PROCESS FOR THE MANUFACTURE OF ZEAXANTHIN

[75] Inventors: Arno Johannes Schocher, Benken; Oswald Wiss, Reinach, both of Switzerland

[73] Assignee: Hoffmann-La Roche Inc., Nutley, N.J.

[22] Filed: Sept. 20, 1973

[21] Appl. No.: 399,019

Related U.S. Application Data

[63] Continuation-in-part of Ser. No. 166,319, July 26, 1971, abandoned.

[30] Foreign Application Priority Data
July 31, 1970 Switzerland.................... 11592/70

[52] U.S. Cl.................. 195/28 R; 195/96; 195/100

[51] Int. Cl............................................. C12d 13/02
[58] Field of Search.................................. 195/28 R

[56] References Cited
UNITED STATES PATENTS
2,974,044  3/1961  Farrow et al..................... 195/28 R Primary Examiner—Alvin E. Tanenholtz
Attorney, Agent, or Firm—Samuel L. Welt; Jon S. Saxe; Richard A. Gaither

[57] ABSTRACT

A process for obtaining zeaxanthin by fermentation utilizing one of two bacterial species which belong to the genus Flavobacter and which are deposited under ATCC 21,588 and ATCC 21,081.

15 Claims, No Drawings

PROCESS FOR THE MANUFACTURE OF ZEAXANTHIN

CROSS-REFERENCE TO RELATED APPLICATIONS

This application is a continuation-in-part of U.S. Pat. application Ser. No. 166,319 filed July 26, 1971, now abandoned, entitled "PROCESS FOR THE MANUFACTURE OF ZEAXANTHIN".

BACKGROUND OF THE INVENTION

This invention relates to a fermentation process for obtaining zeaxanthin (3,3'-dihydroxy-$\beta$-carotene). Zeaxanthin is a naturally occurring pigment useful for imparting a yellow color to a wide variety of foodstuffs, such as poultry products, including egg yolks, as well as to cosmetic preparations.

An example of a microbiological process for obtaining zeaxanthin is found in U.S. Pat. No. 2,974,044 of Farrow et al. However, only relatively low yields of zeaxanthin in admixture with large porportions of various other xanthophylls and carotenes have been obtained by this process. For this reason, isolating the relatively small amounts of zeaxanthin from the relatively large biomass produced by fermentation processes such as that of the Farrow et al. patent has required cumbersome and, hence, uneconomical separation procedures. In addition, due to the relatively small amounts of zeaxanthin as compared with other coloring materials in the biomass produced by such fermentation processes, the biomass material, itself, has not been found to constitute an acceptable additive for poultry feed. This is so because the pigment of the poultry legs, beaks, skin, fat, flesh and egg yolks which results from the use of poultry feeds containing the biomass produced by processes such as that of Farrow et al. is different from that produced by conventional, acceptable poultry feeds containing Plata corn as the source of yellow pigment. This difference in pigment is believed to be chiefly attributable to the relatively small amounts of zeaxanthin as compared with other pigments in the biomass produced by processes such as that of Farrow et al. Therefore, there has been a need for an improved process for producing zeaxanthin by fermentation.

In an article by Courington and Goodwin, *Journal of Bacteriology*, 70, No. 5, pp. 568–571 (1955), that two species of Pseudomonas, i.e., Pseudomonas xanthochrus and Pseudomonas aestumarina, produce zeaxanthin was reported. These two species have also been classified as Flavobacterium xanthochrus and Flavobacterium aestumarina. However, these two particular species have not been reported as providing the required biomass containing improved yields of zeaxanthin or the desired biomass containing zeaxanthin in admixture with the other coloring materials which would be suitable, by itself, as an additive for poultry feed.

SUMMARY OF THE INVENTION

In accordance with the process of this invention, zeaxanthin is obtained by cultivating a bacterial species selected from the group consisting of Flavobacter ATCC 21,588 and Flavobacter ATCC 21,081, in an aqueous nutrient medium containing assimilable sources of carbon and nitrogen. The resulting biomass of this process contains zeaxanthin in high yields and constitutes a useful poultry feed additive for imparting an acceptable yellow color to poultry.

DESCRIPTION OF THE PREFERRED EMBODIMENT

According to the process of this invention, zeaxanthin is produced by fermentation utilizing either one of two microorganisms of the genus Flavobacter, of the family Achromobacteraceae, of the class Schizomycetes, and of the order Eubacteriales. The two microorganisms utilizable according to the process of this invention have been isolated and deposited in the American Type Culture Collection, Rockville, Maryland under ATCC No. 21,588 and ATCC No. 21,081 and the Centralbureau for Schimmelcultures, Baarn, Holland under respectively C.B.S. No. 519/67 and C.B.S. No. 523/67. By the term "Flavobacter ATCC 21,588", it is intended to cover all microorganisms of the genus Flavobacter which produce zeaxanthin and which cannot be definitely differentiated from the strain deposited under ATCC No. 21,588 and C.B.S. No. 519/67 and its subcultures, including mutants and variants. By the term "Flavobacter ATCC 21,081", it is intended to cover all microorganisms of the genus Flavobacter which produce zeaxanthin and which cannot be definitely differentiated from the strain deposited under ATCC No. 21,081 and C.B.S. No. 523/67 and its subcultures, including mutants and variants. By the term "mutants" as used herein there is intended mutants produced from either Flavobacter ATCC 21,588 or Flavobacter ATCC 21,081 by various means such as chemical mutagenic agents, ultraviolet radiation, X-radiation, phage exposure and the like.

The Flavobacter microorganisms utilized according to the process of this invention live symbiotically or parasitically in sea and fresh water and can be obtained in a manner known per se. They can be obtained, for example, from sea-water and sea-sand, from marine animals (e.g., from mussels or oysters) as well as from vegetable material from sea and inland waters. Marine algae or decayed organic material, such as from the shores of Scandinavia or Africa, can be suspended in a physiological saline solution. Differentiating the microorganisms of this invention for further cultivation can then be effected, for example, by a procedure which involves cultivating the suspension in a known manner, purifying the yellow cultures obtained by further cultivation on solid nutrient media and in liquid nutrient solutions, extracting with acetone the carotenoid formed intracellularly and analyzing the carotenoid with the aid of a thin-layer chromatogram. Pure zeaxanthin from Zea mais can expediently serve as the test substance.

Preferably, the isolation and pure cultivation of the yellow Flavobacter microorganisms of this invention is effected as follows. The material from littoral zones from Norway, used as the source of the microorganisms, is suspended in physiological saline. Then, from the supernatant liquid, streak cultures are applied into Petri dishes (nutrient medium: 0.1 percent yeast extract, 0.1 percent tryptone, 1.0 percent common salt and 2 percent agar in tap water, pH 7.2). Then, the yellow colonies growing on the agar are examined for carotenoid content. Finally, the Flavobacter microorganisms of this invention are identified by their zeaxanthin content and isolated.

The material from Africa is preferably treated in an analogous manner.

Utilizing the above procedure, there was cultivated and isolated a series of zeaxanthin-producing strains, of which two selected pure strains according to a taxonomic classification carried out by the Eidg. Technischen Hochschule, Zurich, Switzerland, display properties which best accord with those of the genus Flavobacterium. The two selected pure strains are the Flavobacter ATCC 21,588 and the Flavobacter ATCC 21,081.

The Flavobacter ATCC 21,588 has been characterized as follows by the Eidg. Technischen Hochschule and the National Collection of Industrial Bacteria attached to the Torry Research Station, Aberdeen, Scotland:

Morphology: Gram-negative, short rods with rounded ends. Yellow transparent colonies on sea-water nutrient agar.

Physiological Tests:
| | |
|---|---|
| Kovacs oxidase | + |
| Phosphatase | + |
| Bacteriolytic properties | None |
| Temperature after storage at 37°C. for one day | Growth at 24°C. |
| after storage at 45°C. for one hour | Growth at 24°C. |
| Formation of ammonia from peptone | + |
| Formation of indole from tryptophan | − |
| Lowest concentration of NaCl for growth | 0% |
| Growth at 12% NaCl | + |
| Reduction of nitrate to nitrite | − |

Reaction towards:
| | |
|---|---|
| polymixin B | Strongly sensitive |
| Starch - hydrolysis: | No hydrolysis |
| Hugh & Leifson test (glucose) | No reaction |
| Carbohydrate (acid) | No reaction |
| Litmus milk test: | Discoloration, pH changed |

The Flavobacter ATCC 21,081 has been characterized as follows by the Eidg. Technischen Hochschule and NCIB:

Morphology: Gram-negative rods with rounded ends. Yellow to orange transparent colonies on sea-water nutrient agar Physiological Tests:
| | |
|---|---|
| Temperature after storage at 37°C. for one day | No growth at 24°C. |
| after storage at 45°C. for one hour | No growth at 24°C. |
| Catalase and Oxidase: | + |
| Formation of ammonia from peptone: | + |
| Formation of indole from tryptophan: | − |
| Lowest concentration of NaCl for growth: | 0.5% |
| Growth at 12% NaCl: | − |
| Reduction of nitrate to nitrite: | − |
| Hugh Leifson (glucose) | No reaction |
| Bacteriolytic properties | None |
| Phosphatase | + |

Reaction towards:
| | |
|---|---|
| polymixin B | very slightly sensitive |

Reaction towards:
| | |
|---|---|
| Starch-hydrolysis | Hydrolysis |
| Carbohydrate (acid) | No reaction |
| Litmus-milk test | No reaction |

Further, it has been determined that Flavobacter ATCC 21,588 and Flavobacter ATCC 21,081 cannot grow in the absence of oxygen, do not form a gas from glucose, do not produce $H_2S$ and form a liquid crater on gelatin.

Significant, demonstrable differences exist in the taxonomic description of Flavobacter ATCC 21,588 and Flavobacter ATCC 21,081 of this application and that of Pseudomonas aestumarina and Pseudomonas xanthochrus of Courington et al., supra. These taxonomic differences are summarized in the table which follows and demonstrate that the species of Flavobacteria of this application are completely unrelated to the species of Psuedomonas of Courington and Goodwin. The Taxonomic description in the table of the Pseudomonas aestumarina and Pseudomonas xanthochrus are derived from ZoBell and Upham, Bull. Scripps Inst. Oceanography, 5, 239, 269, 279 (1944).

TABLE

| Parameter | Pseudomonas aestumarina | Pseudomonas xanthochrus | Flavobacter ATCC 21588 | Flavobacter ATCC 21081 |
|---|---|---|---|---|
| Mobility | motile, 2–3 polar flagella | motile, few polar flagella | non-motile | non-motile |
| Size | 0.4 × 1.4 − 1.6 | 0.5 × 1.3 | 0.6–1.3×1.7–4.0 | 0.4–0.7×1.7–2.3 |
| Action on gelatin | no liquefaction | no liquefaction | liquefaction | liquefaction |
| Nutrient broth, fresh water | no growth | no growth | growth | no growth |
| Litmus milk | no change | no change | discoloration, pH change | no change |
| Growth on potato | − | − | + | − |
| Formation of indole | − | − | − | − |
| Reduction of nitrate | + | − | − | − |
| Formation of $H_2S$ | − | − | − | − |
| Formation of $NH_4$ | + | + | + | + |
| Formation of urease | − | − | + | − |
| Acid from Glucose | − | − | + | − |
| Hydrolysis of starch | − | − | − | + |
| Optimal growth temp. | 20–25 | 20–25 | 28 | 24 |
| Oxygen requirement | facultative | facultative | obligatory | obligatory |

The process of this invention for the production of zeaxanthin comprises cultivating a microorganism, selected from the group consisting of Flavobacter 21,588 and Flavobacter 21,081.

The microorganisms deposited under ATCC 21,588 and ATCC 21,081 are obtained by selection or mutation, as above, in an aqueous nutrient solution which contains a source of assimilable carbon and a source of assimilable nitrogen. In obtaining the microorganisms, the nutrient solution may also contain conventional additives. Further, illumination and/or the addition of substances promoting pigment formation and growth may further be utilized in obtaining the microorganism. The resulting zeaxanthin can be conveniently isolated from the cell mass of the resulting cultivated microorganism.

The microorganisms employed in the present process can be cultivated in a conventional manner. In cultivating the microorganisms, any conventional solid nutrient media or any conventional liquid nutrient solution media containing assimilable carbon or nitrogen can be utilized. Preferred media for cultivation are the nutrient media which contain a source of readily assimilable nitrogen and a source of readily assimilable carbon. The preferred media can also contain certain inorganic salts such as NaCl which are conventionally present in such media.

As sources of readily assimilable nitrogen there can be used numerous substances of animal, vegetable and/or microbial origin as well as inorganic nitrogen compounds. Among the preferred sources of readily assimilable nitrogen are soya meal, fish meal, meat meal, meat extract, peptone, tryptone, corn steep liquor, yeast extract, amino acids, ammonium salts, urea and salts of nitric acid.

As sources of readily assimilable carbon there can be used sugars and their polymers, such as starches, dextrin, saccharose, maltose, lactose, glucose, molasses and corn steep liquor, amino acids and their polymers; fatty acids; and polyalcohols such as glycerine. A particularly preferred source of assimilable carbon is glucose.

The preferred media for cultivation also contain trace elements originating from present or added mineral or organic ingredients. Thus, for example, sulphur and phosphorus can originate from inorganic or organic ingredients present in the nutrient medium or be specifically added to the nutrient medium. If desired or required, growth-promoting agents or stimulants such as, for example, vitamins and/or kinetin can further be added to the nutrient medium.

Among the particularly preferred media for the cultivation of Flavobacter ATCC 21,588 and Flavobacter ATCC 21,081 to obtain zeaxanthin are nutrient solutions, containing readily assimilable carbon and nitrogen as well as conventional inorganic salts and trace elements, of the following compositions:

Nutrient Solution I (for Flavobacter ATCC 21,588 and Flavobacter ATCC 21,081)

| | | |
|---|---|---|
| Yeast extract | 5 g | |
| Glucose | 5 g | |
| Tris-(hydroxymethyl)-aminomethane | 1 g | |
| Sodium chloride | 1 g | |
| Magnesium sulphate. 7H$_2$O | 100 mg | |
| Potassium chloride | 100 mg | |
| Sodium nitrate | 100 mg | |
| Calcium chloride, 2H$_2$O | 100 mg | |
| Sodium glycerophosphate | 100 mg | |
| Cobalamin in cyanocobalamin | 1 mg | |

Trace elements:

| | | | |
|---|---|---|---|
| Iron | as iron sulphate. 7H$_2$O | 0.5 mg | |
| Zinc | as zinc chloride | 0.3 mg | |
| Boron | as boric acid | 0.1 mg | |
| Cobalt | as cobalt nitrate. 6H$_2$O | 0.1 mg | |
| Copper | as copper sulphate. 5H$_2$O | 0.1 mg | |
| Manganese | as manganese sulphate | 0.1 mg | |
| Molybdenum | as sodium milybdate | 0.1 mg | |
| aqua destillata quantum satis ad pH 7.5 | | | 1,000 ml; |

Nutrient solution II (for Flavobacter ATCC 21,588 and Flavobacter ATCC 21,081)

| | |
|---|---|
| Yeast extract | 1 g |
| Tryptone | 10 g |
| Glucose | 10 g |
| Sodium chloride | 10 g |
| Tap-water q.s. ad | 1,000 ml; |
| pH = 7.5 | |

Nutrient solution III (for Flavobacter ATCC 21,588 and Flavobacter ATCC 21,081)

| | |
|---|---|
| Yeast extract | 10 g |
| Tryptone | 10 g |
| Glucose | 1 g |
| Sodium chloride | 26 g |
| Magnesium chloride | 3.1 g |
| Magnesium sulphate. 7H$_2$O | 2.2 g |
| Calcium sulphate | 1.2 g |
| Potassium chloride | 0.7 g |
| Magnesium bromide | 0.07 g |
| Tap-water q.s. ad | 1,000 ml; |
| pH = 7.5 | |

Nutrient solution IV (for Flavobacter ATCC 21,588 and Flavobacter ATCC 21,081)

| | |
|---|---|
| Yeast extract | 5 g |
| Tryptone | 10 g |
| Glucose | 1 g |
| Meat extract | 5 g |
| Sodium chloride | 35 g |
| Trace elements (composition as for nutrient medium I) | |
| aqua destillata q.s. ad | 1,000 ml; |
| pH = 7.5 | |

Nutrient solution V (for Flavobacter ATCC 21,588 and Flavobacter ATCC 21,081)

| | |
|---|---|
| Yeast extract | 10 g |
| Tryptone | 10 g |
| Glucose | 5 g |
| Palmitic acid ethyl ester | 20 g |
| Hydrocarbon fraction (C$_{10}$-C$_{20}$) | 10 g |
| Sodium chloride | 30 g |
| Magnesium sulphate. 7H$_2$O | 5 g |
| Tap-water q.s. ad | 1,000 ml; |
| pH = 7.5 | |

Nutrient solution VI (for Flavobacter ATCC 21,588)

| | |
|---|---|
| Glucose | 10 g |
| Urea | 1.5 g |
| Sodium chloride | 20 g |
| Magnesium sulphate. 7H$_2$O | 5 g |
| sec.potassium o-phosphate | 1 g |
| Vitamins: | |
| Biotin | 0.01 mg |
| Thiamine hydrochloride | 1 mg |
| Riboflavin | 1 mg |
| Folic acid | 0.05 mg |
| Pyridoxin hydrochloride | 2 mg |
| Nicotinic acid | 1 mg |
| Calcium pantothenate | 1 mg |
| Trace elements: | |
| Stock solution in ml | 1 mg |

1 ml stock solution contains:

| | | |
|---|---|---|
| Boron | as boric acid | 5 mg |
| Cobalt | as colbalt sulphate. 7H$_2$O | 5 mg |
| Copper | as copper sulphate. 5H$_2$O | 4 mg |
| Manganese | as manganese sulphate. 2H$_2$O | 2.5 mg |
| Iron | as iron sulphate. 7H$_2$O | 5 mg |
| Zinc | as zinc sulphate. | 4 mg |
| Calcium | as calcium chloride 7H$_2$O | 3 mg |
| Agar | | 20 mg |
| aqua destillata q.s. ad | | 1,000 ml; |
| pH = 7.2 | | |

Nutrient solution VIa (for Flavobacter ATCC 21,588)

| | |
|---|---|
| Glucose | 10 g |
| Urea | 1.5 g |
| Sodium chloride | 20 g |
| Magnesium sulphate. 7H$_2$O | 5 g |
| sec.Potassium o-phosphate | 1 g |
| Vitamins: | |
| Nicotinic acid | 1 mg |
| Trace elements: analogous to nutrient solution VI | |
| aqua destillata q.s. ad | 1,000 ml; |
| pH = 7.2 | |

-Continued

| Nutrient solution VII | (for Flavobacter ATCC 21,588 and Flavobacter ATCC 21,081) |
|---|---|
| Glucose | 10 g |
| Total hydrolysate of casein (vitamin-free) | 10 g |
| Sodium chloride | 20 g |
| Sodium sulphate. 7H$_2$O | 5 g |
| sec.Potassium o-phosphate | 1 g |
| Vitamins: analogous to nutrient solution VI | |
| Trace elements: analogous to nutrient solution VI | |
| aqua destillata q.s. ad. pH = 6.6 | 1,000 ml; |

| Nutrient solution VIIa | (for Flavobacter ATCC 21,588 and Flavobacter ATCC 21,081) |
|---|---|
| Glucose | 10 g |
| Total hydrolysate of casein (vitamin-free) | 10 g |
| Sodium chloride | 20 g |
| Sodium sulphate. 7H$_2$O | 5 g |
| sec.Potassium o-phosphate | 1 g |
| Vitamins: Micotinic acid | 1 mg |
| Trace elements analogous to nutrient solution IV | |
| aqua destillata q.s. ad pH = 6.6 | 1,000 ml; and |

| Nutrient solution VIII | for Flavobacter ATCC 21,588 and Flavobacter ATCC 21,081) |
|---|---|
| analogous to nutrient solution VII + 2% agar | |

| Nutrient solution IX | (for Flavobacter ATCC 21,588 and Flavobacter ATCC 21,081) |
|---|---|
| Glucose | 5 g |
| Tryptone | 10 g |
| Yeast extract | 10 g |
| Sodium chloride | 10 g |
| Magnesium sulphate. 7H$_2$O | 5 g |
| aqua destillata q.s. ad pH = 6.5 | 1,000 ml. |

As in the case of nutrient solutions VI and VIII, hereinbefore, the nutrient media utilizable for cultivating the microorganism can be solidified by the addition of agar and used for the cultivation of streak cultures.

The strains utilizable for the cultivation process can be introduced to the fermenting vessel from the streak culture plate according to known methods. The preferred methods are via the agar-slant culture and glass-flask liquid culture.

Cultivation of the microorganism to form zeaxanthin according to the process of this invention may be carried out in any conventional manner. In accordance with the preferred manner of carrying out this process, cultivation is carried out submergedly in an aqueous media. In carrying out this submerged cultivation, any conditions which are conventionally utilized in carrying out submerged cultivation may be used. In the submerged cultivation of this invention, the fermentation is suitably carried out at a temperature between 10° and 35°C. with a temperature of between 20° and 28°C. being preferred. According to a particularly preferred embodiment of the process of this invention, the microorganism is submergedly and aerobically cultivated in an agitated nutrient solution initially at a temperature of 28° to 35°C. until a sufficient amount of culture is formed, and then cultivation is carried out between 20° and 28°C. By the process of this invention, formation of pigment increases in proportion to the growth of the culture, with the maximum pigment formation being reached after about 1 to 4 days.

In carrying out the cultivation process of this invention, natural light and artificial light with the spectral range of daylight are preferably utilized to promote the formation of zeaxanthin.

Cultivation is also preferably carried out by employing certain yield promoting additives in the media. Among the preferred additives are included emulsifiers, defoaming agents, and promoters of pigment formation. The increase in yield achievable in a particular case can be seen from the following Table in which some particularly preferred additives are set out.

Table

Increase of yield of zeaxanthin in percent when using nutrient solution II, III or VII above in the presence of the specified additives:

| Additive | Amount in % | Increase in formation of zeaxanthin in % |
|---|---|---|
| Tween 80 (Polyoxyethylenesorbitan monooleate) | 1-5 | 140-150 |
| Tween 60 (Polyoxyethylenesorbitan monostearate) | 1 | 157 |
| Tween 80 + soya oil | 1+2 | 150 |
| Tween 80 + kerosene | 1+1 | 128 |
| Tween 80 + kerosene + soya oil | 1+1+2 | 138 |
| Isonicotinic acid hydrazide | 0.001 | 120 |
| Sorbitol | 0.5 | 133 |
| Palmitic acid methyl ester | 0.5 | 286 |
| Palmitic acid methyl ester + sorbitol | 0.5+0.5 | 270 |
| Lactic acid | 0.5 | 140 |

In carrying out the cultivation of this invention, it is further preferred to provide a high carbohydrate content of from about 1 percent up to about 10 wt. percent of the nutrient media and a high phosphate content of from 0.1 percent up to a maximum of 1 wt. percent of the nutrient media. In this cultivation, it is especially preferred that the high content of carbohydrate comprise glucose and/or that the high content of phosphate comprise sec.potassium o-phosphate.

In carrying out the cultivation of this invention, it is still further preferred to increase the oxygen partial pressure during the cultivation. It is particularly preferred to carry out the cultivation under partial pressures of oxygen greater than ambient at a temperature of 24°C.

After completion of the cultivation of the microorganism, the cell-mass is isolated by centrifugation or filtration. The pigment-containing cell-mass can be advantageously utilized in accordance with this invention to color foodstuffs without the necessity for isolating pure zeaxanthin pigment. On the otherhand, the intracellular zeaxanthin can be separated from the cells in a conventional manner. A preferred method of separating the zeaxanthin involves the process of extraction by the steps of carefully drying the cell-mass; pulverizing the dried cell-mass; digesting the pulverized material with an inert organic solvent; evaporating the solvent; taking up the evaporation residue, for example, in an inert organic solvent; filtering the solution; and isolating the pure zeaxanthin by elution of the filtration residue with an inert organic solvent. The individual steps of the preferred method can be carried out in a conventional manner. According to a particularly preferred method of separating the zeaxanthin, the cell-mass is dried by a freeze drying method. Also particularly preferred is to digest the pulverized material with a lower alkanol, preferably ethanol; a ketone, preferably acetone; or a halogenated hydrocarbon; preferably chloroform. Further, particularly preferred is to take up the evaporation residue in ethylacetate, a lower alkanol or mixtures thereof. Further, particularly preferred is to filter the solution over silica gel, neutral aluminum oxide, or magnesium silicate. Still further particularly preferred is to elute the zeaxanthin with a chlorinated hydrocarbon, particularly methylene chloride or dichloroethylene or a di-lower alkyl ether, particularly diethyl ether.

The almost pigment-free cell-mass remaining behind after separation of the zeaxanthin can be used as an ideal source of proteins and vitamins for the rearing of poultry because of its content of essential amino acids (e.g. methionine and lysine) and vitamins (especially vitamins of the B-group and particularly vitamin $B_{12}$).

The pigment formed by the Flavobacteria consists of up to 90–100 percent of zeaxanthin which has been shown by comparison to be identical with zeaxanthin isolated from Zea mais.

The pure zeaxanthin manufactured according to the process of this invention and the pigment-containing cell-mass can be used for the coloring of foodstuffs (which term will also be understood to include living poultry) as well as for the coloring of cosmetic preparations. The pigment-containing cell-mass is especially suitable for the coloring of legs, beaks, skin, fat, flesh and egg-yolk of poultry.

The following Examples further illustrate the present invention. The nutrient solutions or media referred to in the Examples are the nutrient media I-IX set forth hereinbefore.

EXAMPLE 1

A Flavobacter ATCC 21,081 agar-slant culture is suspended in a 500 ml Erlenmeyer flask which contains 100 ml of a nutrient solution as described hereinbefore under I is incubated with shaking for 24 hours at 22°C. The pre-culture is used as the inoculum for 8 liters of a nutrient solution of the same composition which, after inoculation, is aerated with shaking at 22°C. for 36 hours. The fermentation solution is subsequently centrifuged. In dried state, the cell-mass can be directly used for coloring purposes.

For the analytical determination of content, a portion of the cell-mass is digested in acetone. The acetone solution is dried over sodium sulphate and evaporated. The residual zeaxanthin is isolated in pure form by preparative thin-layer chromatography.

For the preparative production of pure zeaxanthin, the moist cell-material is dried under careful conditions and exhaustively extracted with ethylacetate. The extract is then concentrated and adsorbed on silica gel. The pure zeaxanthin is obtained by elution with diethyl ether.

EXAMPLE 2

By utilizing the procedures of Example 1, Flavobacter ATCC 21,588 culture is cultivated in a nutrient solution as described hereinbefore under III, and zeaxanthin is obtained by extraction with chloroform.

EXAMPLE 3

By utilizing the procedures of Example 1, Flavobacter ATCC 21,081 culture is cultivated in a nutrient solution as described hereinbefore under II, IV, or V. The cell-material is centrifuged off and hydrolyzed by treatment with a 20 percent methanolic potassium hydroxide solution in the course of a few hours at room temperature (25°C) and with the exclusion of atmospheric oxygen. The zeaxanthin containing cell-material obtained is especially suitable as an additive to poultry feed.

EXAMPLE 4

90 Liters of a nutrient solution as described hereinbefore under III, VII or IX is inoculated with a 24 hour-old Flavobacter ATCC 21,588 suspension and aerated with stirring for 72 hours at between 22° and −28°C. The cell-material formed is centrifuged off and dried under reduced pressure at about 40°C. The zeaxanthin containing cell-material can be used as an additive to poultry feed.

EXAMPLE 5

8 liters of a nutrient solution as described hereinbefore under IX are inoculated with a 24 hour-old Flavobacter ATCC 21,588 suspension and, with stirring (300 rpm), aerated with 4 liters of air per minute at 20°–22°C. After 48 hours, the fermentation solution contains 30–40 mg of zeaxanthin per liter. The fermentation process is thereafter terminated. The zeaxanthin-containing cell-material is centrifuged off and dried under reduced pressure at 40°C. The dry zeaxanthin obtained can be used as described in the following Examples for pigmenting poultry and, especially, for pigmenting hens eggs.

EXAMPLE 6

The cell-material obtained from the cultivation of Flavobacter strain ATCC 21,588 in Example 5 was tested as follows for its suitability for pigmenting poultry. Three groups each consisting of 20 Nichols chickens were fed with a feed of the following composition until 56 days old:

| | | |
|---|---|---|
| Maize | 35 % | |
| Rice | 12 % | |
| Wheat grist | 12 % | |
| Soya | 34 % | |
| Beef tallow | 3 % | |
| Fodder yeast | 1 % | |
| Bonemeal | 2 % | |
| Limestone chips | 0.4% | |
| Common salt | 0.3% | |
| Vitamin A | 12,000 IU/kg) | |
| Vitamin $B_2$ | 4 mg/kg) | together with carrier |
| Vitamin $D_3$ | 1,000 IU/kg) | material 0.3% |
| Vitamin E | 20 IU/kg) | |

Group 1 received the basic feed without additive; Group 2 received 2 wt. percent of cell-material as an additive to the basic feed and Group 3 received 4 wt. percent of cell-material as an additive to the basic feed of Group 3.

All chickens were killed at an age of 56 days and made oven-ready. In so doing, the pigmentation of skin, beak, leg and body fat of each individual chicken was measured. Group 1 displayed practically no pigmentation, Group 2 was weakly pigmented and Group 3 was markedly and strongly pigmented and significantly more strongly than Group 2.

EXAMPLE 7

The cell-material obtained in Example 5 from Flavobacter strain ATCC 21,588 was tested as follows for its suitability for pigmenting eggs.

Four groups each consisting of 18 high-value laying hens were fed for 4 weeks with the basic feed described in Example 6. Group 1 received the basic feed without additive, while 0.5 wt. percent of cell-material were added to the basic feed of Group 2, 1.0 wt. percent of cell-material were added to the basic feed of Group 3 and 2.0 wt. percent of cell-material were added to the basic feed of Group 4.

From the 14th day of the experiment onwards, 30 eggs were collected from each group of hens. The strength of the pigmentation of the egg-yolk was determined with the aid of the Roche color scale (*Poultry Sci.*, vol. 48 (1969) No. 3, page 767–779). The following degrees of pigmentation were measured:

| | |
|---|---|
| Eggs of Group 1 | 2.9 |
| Eggs of Group 2 | 7.1 |
| Eggs of Group 3 | 9.8 |
| Eggs of Group 4 | 11.2. |

In a repeat of the pigmentation experiment under the experimental conditions described hereinbefore with a cell-material obtained in accordance with Example 5, utilizing the Flavobacter strain ATCC 21,081, the following degrees of pigmentation were measured:

| | |
|---|---|
| Eggs of Group 1 | 2.9 |
| Eggs of Group 2 | 6.4 |
| Eggs of Group 3 | 9.1 |
| Eggs of Group 4 | 10.7. |

EXAMPLE 8

Derco laying hens fed with a pigment-poor feed of the following composition:

| Ingredients | Proportion in % |
|---|---|
| Milo corn | 70.00 |
| Soybean meal | 10.00 |
| Herring meal | 3.00 |
| Cod meal | 2.00 |
| Whey | 1.60 |
| Barley grist | 4.00 |
| Oat grist | 2.00 |
| Wheat grist | 1.75 |
| Bone fodder meal | 2.00 |
| Calcium carbonate | 3.025 |
| Salt | 0.25 |
| Vitamin mixture I[1]) | 0.10 |
| Vitamin mixture II[2]) | 0.125 |
| Mineral mixture [3]) | 0.15 |

1) Vitamin mixture I contains per kg of fodder:
8 million I.U. vit. A
0.8 million I.U. vit. $D_3$ 26.7 g
Aureomycin 2) Vitamin mixture II contains per kg fodder:
3 g vitamin $B_2$
5 g $C_A$ pantothenate
10 g nicotinic acid
50 g choline chloride
1 g vitamin $B_1$
0.5 g vitamin $B_6$
5 mg vitamin $B_{12}$
4000 I.U. vitamin E
1.5 g vitamin K
0.5 g folic acid 3) Mineral mixture contains per kg fodder:
10 g iron
40 g manganese
40 g zinc
2.5 g copper
2 g iodine
0.2 g cobalt lay, after a time, almost completely white, practically pigmentless egg-yolks (value of the Roche color scale less than 1). If, at this stage, the hens are additionally given a dry cell-material consisting of a mixture of equal parts of zeaxanthin containing cell-material derived from Flavobacter ATCC 21,081 and Flavobacter ATCC 21,588, with a content of 8 ml. of zeaxanthin/kg feed, the pigment content of the egg-yolk strongly increases from about the 14th day from the beginning of the feeding, as is evident from the following Table.

Table

| Group of hens | Carotenoid content of fodder administered in mg/kg | Yolk pigmentation: visual color value (Roche color scale) mean values |
|---|---|---|
| 1 | 0 | 1 |
| 2 | 0 | 1 |
| 3 | 8 mg zeaxanthin | 9 |
| 4 | 8 mg zeaxanthin | 9 |
| 5 | 8 mg zeaxanthin | 9 |
| 6 | 8 mg zeaxanthin | 10 |

We claim:

1. A process for the preparation of zeaxanthin containing cell-mass, comprising:
cultivating a microorganism selected from the group consisting of Flavobacter ATCC 21,081 and Flavobacter ATCC 21,588 in a nutrient media which contains a source of assimilable carbon and a source of assimilable nitrogen.

2. The process of claim 1 wherein said nutrient media is an aqueous solution.

3. The process of claim 2 wherein said nutrient media is agitated and subjected under partial pressures of oxygen greater than ambient at a temperature of 24°C.

4. The process of claim 2 wherein said cultivation is carried out at 10°–35°C.

5. The process of claim 4 wherein said cultivation is carried out at 20°–28°C.

6. The process of claim 1 wherein said microorganism is submergedly and aerobically cultivated in an agitated nutrient solution initially at a temperature between 28° and 35°C. and subsequently at a temperature between 20° and 28°C.

7. The process of claim 1 wherein said nutrient media includes up to 10 percent by weight of a carbohydrate.

8. The process of claim 7 wherein said carbohydrate is glucose.

9. The process of claim 1 wherein said nutrient media includes up to 1 percent by weight of a phosphate.

10. The process of claim 8 wherein said phosphate is sec.potassium o-phosphate.

11. The process of claim 1 wherein a promoter of pigment formation is added to said nutrient media.

12. The process of claim 11 wherein said pigment formation promoter is selected from the group consisting of lactic acid and palmitic acid methyl ester.

13. A process for the preparation of zeaxanthin, comprising:
cultivating a microorganism selected from the group consisting of Flavobacter ATCC 21,081 and Flavobacter ATCC 21,588 in a nutrient media which contains a source of assimilable carbon and a source of assimilable nitrogen to yield a zeaxanthin containing cell-mass; and
separating the zeaxanthin from said cell-mass.

14. The process of claim 13 wherein said microorganism is cultivated in an aqueous nutrient media at 10°–35°C.

15. The process of claim 13 wherein the zeaxanthin is separated from said cell-mass by: drying said cell-mass;
pulverizing said cell-mass;
digesting said cell-mass with an inert organic solvent to dissolve the zeaxanthin; and
evaporating said solvent from the zeaxanthin.

* * * * *

PO-1050
(5/69)

UNITED STATES PATENT OFFICE
CERTIFICATE OF CORRECTION

Patent No. 3,891,504         Dated June 24, 1975

Inventor(s)   ARNO JOHANNES SCHOCHER AND OSWALD WISS

It is certified that error appears in the above-identified patent and that said Letters Patent are hereby corrected as shown below:

On page 1, under "Foreign Application Priority Data" add -- August 17, 1970 - Switzerland - 12268/70 --.

Signed and Sealed this fourteenth Day of October 1975

[SEAL]

Attest:

RUTH C. MASON
Attesting Officer

C. MARSHALL DANN
Commissioner of Patents and Trademarks